United States Patent
Lin

(10) Patent No.: US 8,073,511 B2
(45) Date of Patent: Dec. 6, 2011

(54) SLIDING MECHANISM FOR ELECTRONIC DEVICE

(75) Inventor: Shing-Huei Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 403 days.

(21) Appl. No.: 12/424,824

(22) Filed: Apr. 16, 2009

(65) Prior Publication Data

US 2010/0123998 A1 May 20, 2010

(30) Foreign Application Priority Data

Nov. 14, 2008 (CN) .......................... 2008 1 0305558

(51) Int. Cl.
*H04M 1/00* (2006.01)

(52) U.S. Cl. .................................. 455/575.4; 455/575.1
(58) Field of Classification Search ............... 455/575.1, 455/575.4, 575.3; 379/433.11
See application file for complete search history.

(56) References Cited

U.S. PATENT DOCUMENTS

| | | | | |
|---|---|---|---|---|
| 7,869,844 B2* | 1/2011 | Lee et al. | ................... | 455/575.4 |
| 2006/0046796 A1* | 3/2006 | Park et al. | ................... | 455/575.4 |
| 2008/0261659 A1* | 10/2008 | Jang et al. | ..................... | 455/566 |

* cited by examiner

*Primary Examiner* — Peguy Jean Pierre
(74) *Attorney, Agent, or Firm* — Altis Law Group, Inc.

(57) ABSTRACT

An electronic device includes a first body and a second body. The second body is slidably connected to the first body. The second body includes a rolling assembly. The rolling assembly includes a rolling member contacting to the first body. When the second body slides relative to the first body, the rolling member rolls on the first body.

17 Claims, 4 Drawing Sheets

SLIDING MECHANISM FOR ELECTRONIC DEVICE

BACKGROUND

1. Technical Field

The present disclosure generally relates to electronic devices and, particularly, to a slide type electronic device.

2. Description of the Related Art

Slide type electronic devices have become increasingly popular in the consumer market, as users are able to open or close a sliding cover with only one hand, and the sliding cover is capable of being integrated with various operating interfaces.

A typical slide type electronic device often includes a main body, a sliding cover and a sliding assembly. The sliding assembly includes a first sliding plate, a second sliding plate and an elastic member. The first sliding plate is connected to the main body. The second sliding plate is connected to the sliding cover. The first sliding plate defines two grooves and the second sliding plate defines two guiding portions to be received in the two grooves correspondingly. The elastic member is mounted between the first sliding plate and the second sliding plate. The elastic member is capable of providing an elastic force to the sliding cover. Thus, the sliding cover can slide along the main body by the elastic force.

However, a large sliding friction is often generated between the grooves and the guiding portion. Thus, the second sliding plate may be incapable of sliding smoothly. The friction also causes the portion defining the grooves and the guiding portion to become abraded. Therefore, the sliding assembly has a relatively short lifespan.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
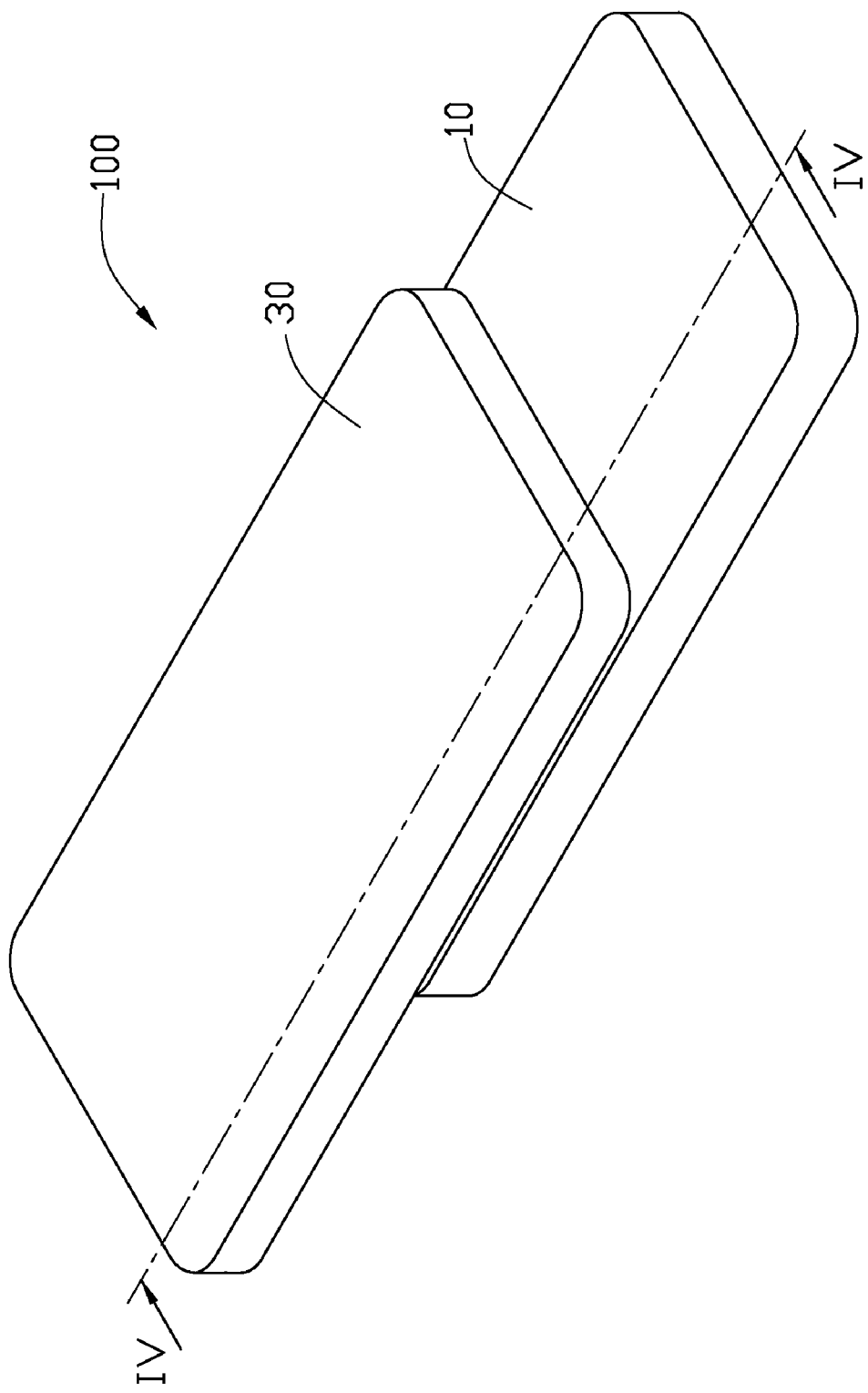
FIG. 1 is an assembled, isometric view of a first embodiment of a slide type electronic device.

Reference will now be made to the drawings to describe exemplary embodiments of the present slide type electronic device. The slide type electronic device may be a mobile phone, a personal digital assistant (PDA), etc. Referring to FIG. 1, a first exemplary embodiment of the slide type electronic device 100 is described and illustrated as a mobile phone.

Figure 2:
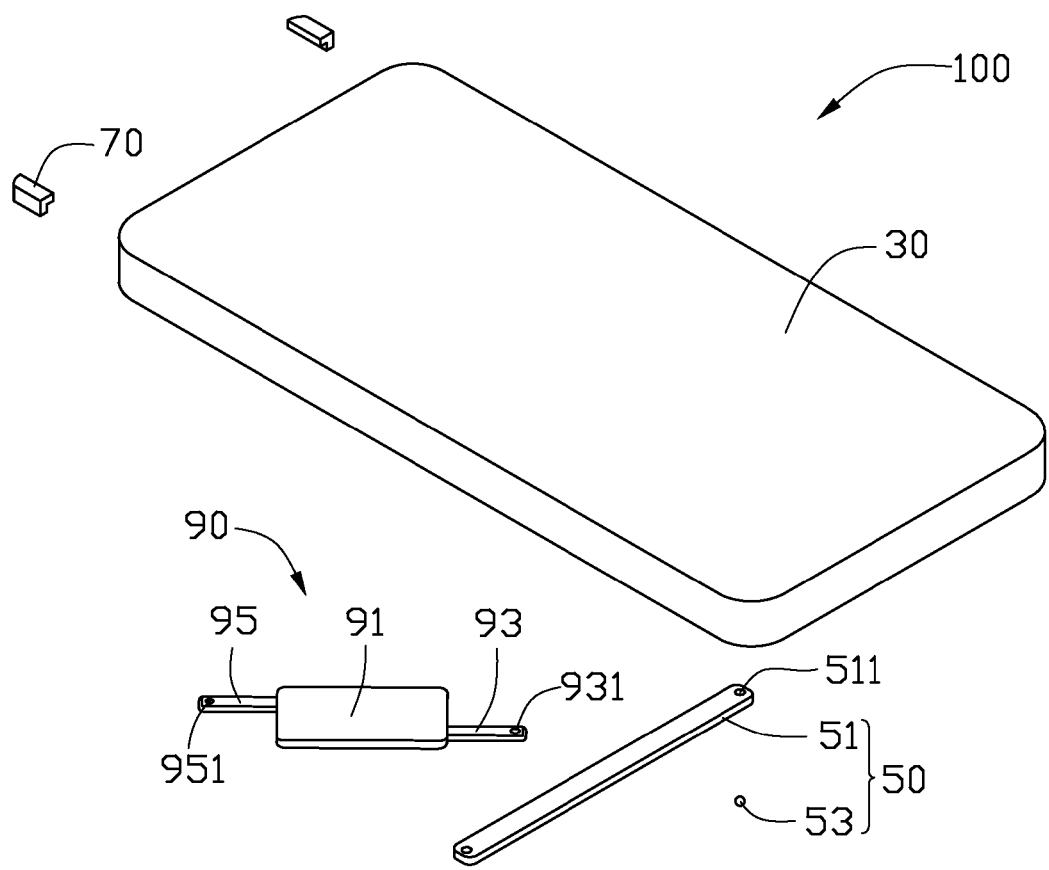
FIG. 2 is an exploded, isometric view of the slide type electronic device of FIG. 1.
Figure 2:
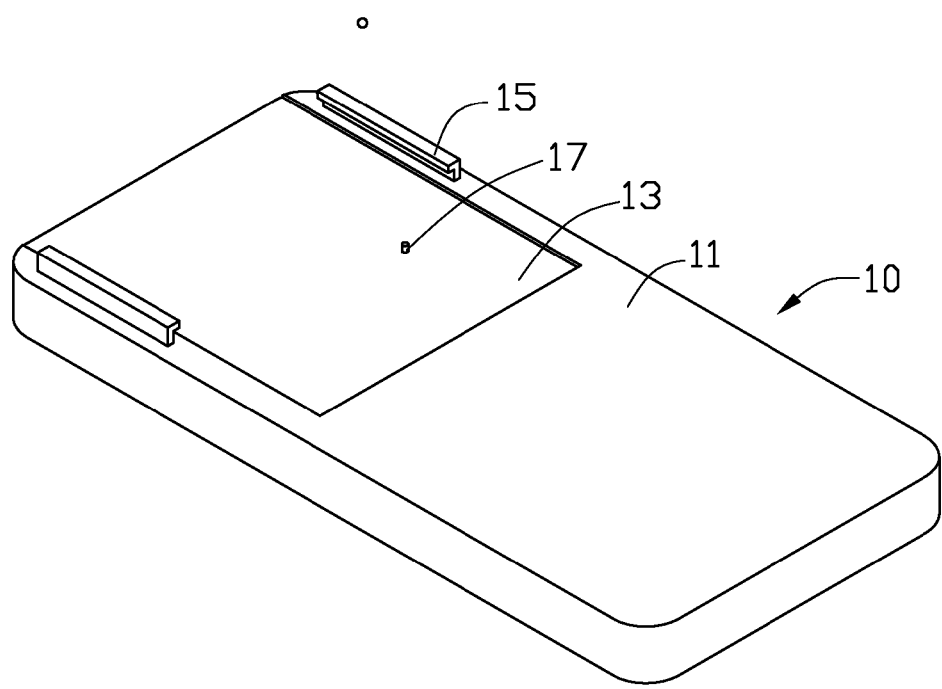

Referring to FIG. 1 and FIG. 2, the slide type electronic device 100 includes a first body 10, a second body 30, a rolling assembly 50, two restricting members 70, and a connecting member 90. The second body 30 is slidably connected to the first body 10. The rolling member 50 and the restricting members 70 are mounted on the second body 30. The connecting member 90 connects the first body 10 with the second body 30.

Referring to FIG. 2, the first body 10 includes a first coupling surface 11, a first receiving slot 13 defined in the first coupling surface 11, two guiding portions 15 protruding from the first coupling surface, and a first connecting protrusion 17 protrudings from the first receiving slot 13. The guiding protrusions 15 are symmetrically arranged at the opposite sides of the first receiving slot 13. The first connecting protrusion 17 is arranged between the guiding portions 15.

Figure 3:
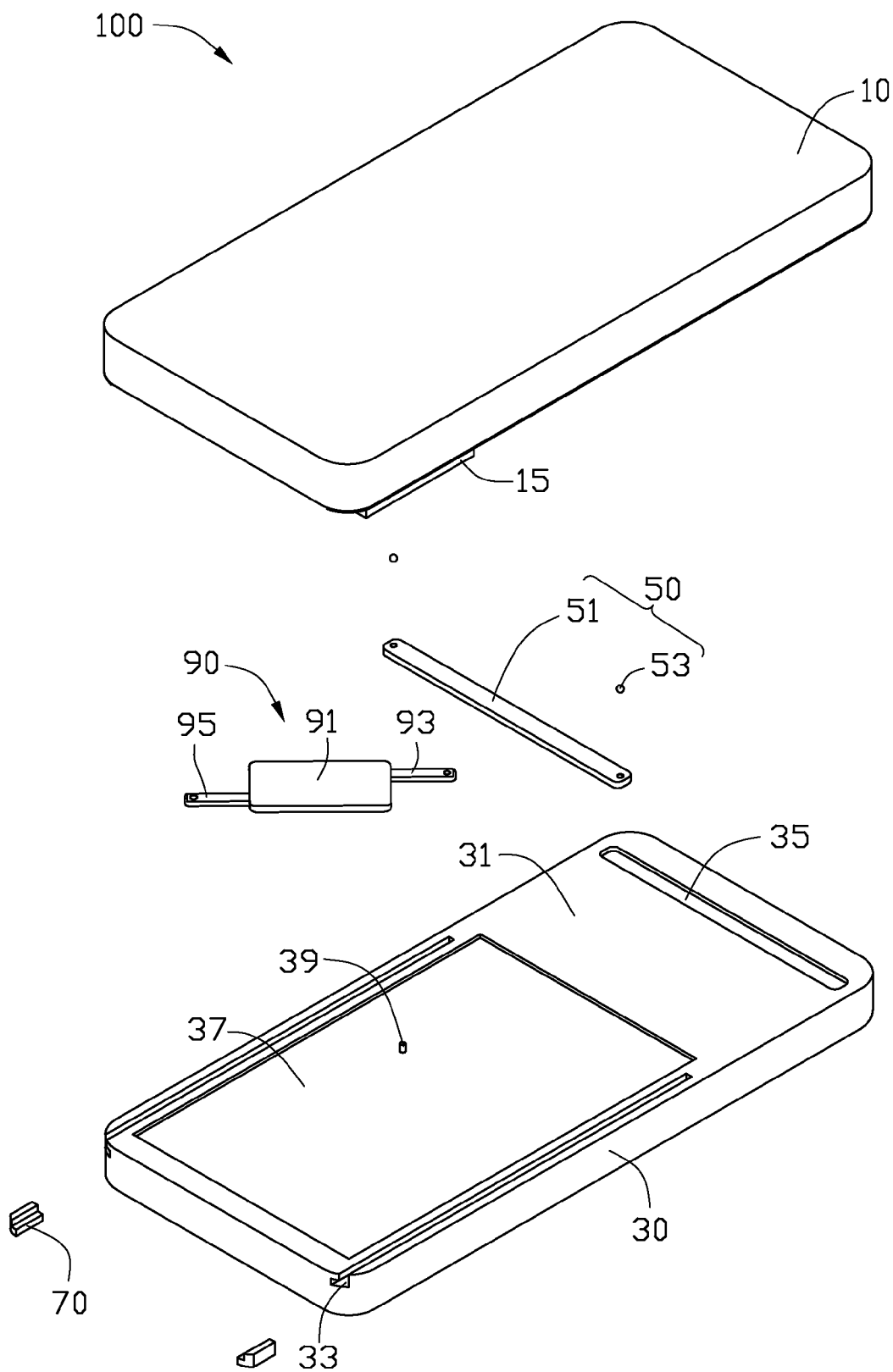
FIG. 3 is an exploded, isometric view of the slide type electronic device of FIG. 1 viewed from another aspect.

Referring to FIG. 3, the second body 30 includes a second coupling surface 31, two guiding slots 33, a positioning slot 35, and a second receiving slot 37. A second connecting protrusion 39 protrudes from the second receiving slot 37. The positioning slot 35 is defined in the one end of the second coupling surface 31. The second receiving slot 37 is defined in the second coupling surface 31 away from the positioning slot 35. The guiding slots 33 are arranged at the two sides of the second receiving slot 37. The guiding protrusions 15 of the first body 10 are received in the guiding slots 33 correspondingly, and can slide in the guiding slots 33. The second connecting protrusion 39 is arranged between the guiding slots 33.

Figure 4:
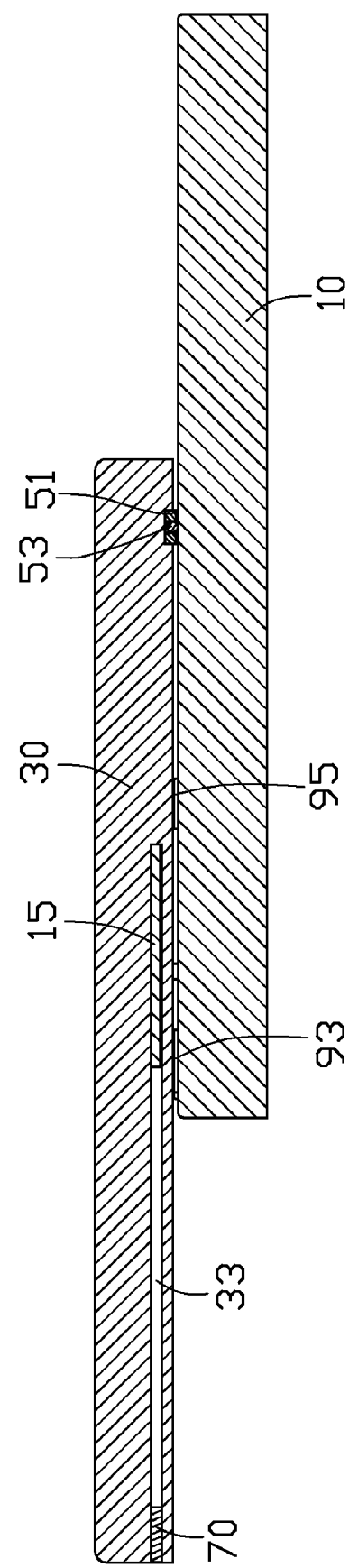
FIG. 4 is a cross-sectional view of the slide type electronic device taken along line IV-IV of FIG. 1.

Referring to FIG. 2 and FIG. 4, the rolling assembly 50 includes a fixing member 51 and two rolling members 53. The fixing member 51 defines two receiving holes 511 at the opposite ends of the fixing member 51. The fixing member 51 is received in the positioning slot 35 of the second body 30. The rolling members 53 are spheres, and are received in the receiving holes 511 of the fixing member 51 correspondingly. Part of the rolling members 53 protrude from the receiving holes 511 of the fixing member 51, and contact the first coupling surface 11 of the first body 10.

The restricting members 70 are arranged in the guiding slots 33 of the second body 30, and positioned at the ends of the guiding slots 33 away from the positioning slot 35. The restricting members 70 prevent the guiding protrusions 15 from sliding out of the guiding slots 33. The restricting members 70 are made of rubber for cushioning the impact between the restricting member 70 and the guiding protrusion 15.

The connecting member 90 includes a main portion 91, a first connecting arm 93, and a second connecting arm 95. The first connecting arm 93 and the second connecting arm 95 are telescopically connected to opposite sides of the main portion 91. The main portion 91 is received in a space formed between the first receiving slot 13 and the second receiving slot 37. The end of the first connecting arm 93 away from the main portion 91 defines a first connecting hole 931. The first connecting hole 931 of the first connecting arm 93 engages with the first connecting protrusion 17 of the first body 10. The end of the second connecting arm 95 away from the main portion 91 defines a second connecting hole 951. The second connecting hole 951 of the second connecting arm 93 engages with the second connecting protrusion 39 of the second body 30.

When the first body 10 slides relative to the second body 30, the rolling members 53 roll on the first coupling surface 11 of the first body 10. The guiding protrusion 15 slides along the guiding slot 33 for guiding the rolling members 53. The guiding protrusion 15 and walls defining the guiding slot 33 slightly contact with each other, i.e., a force applied therebetween is quite small or even none. The friction between the rolling member 53 and the first coupling surface 11 of the first body 10 is rolling friction, therefore, there is a little force of friction between the rolling member 53 and the first coupling surface 11 of the first body 10. Thus, in a sliding process, the first body 10 and the second body 30 slide smoothly and only a small amount of abrasion occurs on the first surface 11 of the first body 10 has a little abrasion. The fixing member 51 is positioned in the positioning slot 35 of the second body 30 detachably, for facilitating easy access for replacing the rolling members 53.

In an alternative embodiment, the rolling member 53 may be a wheel, and the rolling assembly 50 may also includes a shaft positioned in the receiving hole 511 of the fixing member 51, and the rolling members 53 may engage with the shaft and roll about the shaft. The fixing member 51 and the restricting members 70 may be integrated with the second body 30, and the rolling members 53 may be positioned in the second body 30 directly.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
a first body including a first coupling surface;
a second body slidably connected to the first body, the second body including a second coupling surface parallel to the first coupling surface; and
a rolling assembly including a fixing member and two rolling members, the fixing member defining two receiving holes at opposite ends thereof, the rolling members freely positioned and retained between the fixing member and the second coupling surface, and partially exposed from the receiving holes for rolling on the first coupling surface.

2. The electronic device of claim 1, wherein the second coupling surface of the second body defines a positioning slot, the fixing member is engaged in the positioning slot.

3. The electronic device of claim 1, wherein the first body has at least one guiding protrusion; the second body defines at least one guiding slot for receiving the at least one guiding protrusion.

4. The electronic device of claim 3, wherein the electronic device further comprises at least one restricting member, the at least one restricting member is positioned at one end of the at least one guiding slot.

5. The electronic device of claim 4, wherein the restricting member is made of rubber.

6. The electronic device of claim 4, wherein the at least one guiding protrusion comprises two guiding protrusions, the at least one guiding slot comprises two guiding slots, and the at least one restricting member comprises two restricting members.

7. The electronic device of claim 1, wherein the electronic device further comprises a connecting member for slidably connecting the first body with the second body.

8. The electronic device of claim 7, wherein the connecting member includes a main portion, a first connecting arm telescopically connects to the main portion, and a second connecting arm telescopically connects to the main portion.

9. The electronic device of claim 8, wherein the first body protruding a first connecting protrusion, the first connecting arm defines a first connecting hole for receiving the first connecting protrusion; the second body protruding a second connecting protrusion; the second connecting arm defines a second connecting hole for receiving the second connecting protrusion.

10. The electronic device of claim 1, wherein each of the rolling members is a sphere.

11. An electronic device, comprising:
a first body including a first coupling surface;
a second body slidably connected to the first body, the second body including a second coupling surface parallel to the first coupling surface; and
a rolling member including a fixing member and two rolling member, the fixing member defining two receiving holes at opposite ends thereof, the rolling member freely positioned and retained between the fixing member and the second coupling surface, and partially exposed from the receiving holes to create rolling friction on the first coupling surface during sliding thereof.

12. The electronic device of claim 11, wherein the first body has at least one guiding protrusion; the second body defines at least one guiding slot for receiving the at least one guiding protrusion.

13. The electronic device of claim 12, wherein the electronic device further comprises at least one restricting member, the at least one restricting member is positioned in one end of the at least one guiding slot.

14. The electronic device of claim 13, wherein the restricting member is made of rubber.

15. The electronic device of claim 13, wherein the at least one guiding protrusion comprises two guiding protrusions, the at least one guiding slot comprises two guiding slots, and the at least one restricting member comprises two restricting members.

16. The electronic device of claim 11, wherein the electronic device further comprises a connecting member for slidably connecting the first body with the second body.

17. The electronic device of claim 16, wherein the connecting member includes a main portion, a first connecting arm telescopically connects to the main portion, and a second connecting arm telescopically connects to the main portion.

* * * * *